United States Patent [19]

Hirabayashi

[11] Patent Number: 4,765,141
[45] Date of Patent: Aug. 23, 1988

[54] METHOD OF CONTROLLING A VARIABLE GEOMETRY TYPE TURBOCHARGER

[75] Inventor: Yuji Hirabayashi, Zushi, Japan

[73] Assignee: Nissan Motor Co., Ltd., Kanagawa, Japan

[21] Appl. No.: 109,587

[22] Filed: Oct. 19, 1987

Related U.S. Application Data

[62] Division of Ser. No. 706,623, Feb. 28, 1985.

[30] Foreign Application Priority Data

Feb. 29, 1984 [JP] Japan ................................ 59-36103
Feb. 29, 1984 [JP] Japan ................................ 59-36104

[51] Int. Cl.⁴ ............................................. F02B 37/12
[52] U.S. Cl. ...................................................... 60/602
[58] Field of Search ................. 60/600, 601, 602, 603, 60/605

[56] References Cited

U.S. PATENT DOCUMENTS 4,477,875 10/1984 Suzuki et al. ...................... 60/603
4,519,210 5/1985 Iwamoto et al. ................... 60/602
4,617,799 10/1986 Tadokoro et al. .................. 60/602
4,658,586 4/1987 Iwasa ................................... 60/602

FOREIGN PATENT DOCUMENTS 10117 1/1983 Japan .................................. 60/602
18522 2/1983 Japan .................................. 60/602

Primary Examiner—Michael Koczo
Attorney, Agent, or Firm—Foley & Lardner, Schwartz, Jeffery, Schwaab, Mack, Blumenthal & Evans

[57] ABSTRACT

A controller for a variable geometry type turbocharger controls a sectional area of an throttle throat of a turbine through which exhaust gases from an engine is supplied to the turbine on the basis of a engine speed and an amount of air introduced into the engine and includes a bypass path which bypasses the turbine to reduce the exhaust gases supplied to the turbine by controlling the opening and closure of the bypass path on the basis of the engine speed and the amount of air introduced into the engine, thereby preventing the degradation of the supercharged air supplied to the engine and improving torque of the engine in all the operating area of the engine.

7 Claims, 11 Drawing Sheets

METHOD OF CONTROLLING A VARIABLE GEOMETRY TYPE TURBOCHARGER

This application is a division, of application Ser. No. 706,623, filed Feb. 28, 1985.

TECHNICAL FIELD OF THE INVENTION

The present invention relates to a controller for a variable geometry type turbocharger, and more particularly to a controller for a variable geometry type turbocharger for an engine of an automobile, in which the amount of exhaust gas from the engine introduced into a turbine is changed and which includes a bypass mechanism for bypassing the turbine to reduce the amount of exhaust gase supplied to the turbine.

BACKGROUND OF THE INVENTION

An engine having a turbocharger generally utilizes the energy of the exhaust gas from the engine to rotate a turbine which rotates a compressor connected in a coaxial relationship with the turbine to increase the amount of air introduced into the cylinders of the engine, thereby supplying supercharged air having positive pressure at atmospheric pressure or more to the engine to improve the torque thereof.

In such an engine having the turbocharger, since the pressure of the supercharged air can not be increased excessively in consideration of durability of the engine, a bypass mechanism is provided which bypasses the turbine to decrease the amount of exhaust gas supplied to the turbine from the engine.

On the other hand, the pressure of the supercharged air is determined by the capacity of the turbine. Accordingly, when a small turbine is used, torque of the engine at a low speed is improved but torque at a high speed is reduced, whereas when a large turbine is used, torque of the engine at a high speed is improved but torque at low and middle speed is reduced. Thus, there has been proposed a variable geometry type turbocharger, for example, in Japanese Utility Model Application Laid-open No. 50310/78, in which the amount of exhaust gas introduced into the turbine can be changed in accordance with operating conditions of the engine to increase torque of the engine in a range from a low speed operation to a high speed operation of the engine.

Such a variable geometry type turbocharger changes a sectional area of a throttle throat of a scroll forming a turbine by means of a flap valve disposed in the throttle throat to vary flow velocity of exhaust gases introduced into the turbine, thereby maintaining the supercharged air at an outlet of the compressor to a predetermined pressure and increasing torque of the engine in a range from a low speed operation to a high speed operation.

However, with such a prior art variable geometry type turbocharger, when the sectional area of the throttle throat of the turbine is reduced by closing the flap valve in order to increase pressure of the supercharged air at a low engine speed, pressure of the exhaust gas at the throttle throat of the turbine is increased at an early stage, so that the bypass valve of the bypass mechanism is open before a predetermined amount supercharged air is obtained, thereby degrading the supercharged air and reducing torque of the engine.

SUMMARY OF THE INVENTION

It is an object of the present invention to provide a controller for a variable geometry type turbocharger in which degradation of supercharged air supplied to an engine is prevented and torque of the engine is improved in all the operating ranges from a low speed to high speed area.

It is another object of the present invention to provide a controller for a variable geometry type turbocharger in which supercharged air is supplied to an engine so that operation of the engine when changing from an operating area of a variable geometry mechanism for the turbocharger to an operating area of a bypass mechanism of exhaust gas is smoothly attained.

It is still another object of the present invention to provide a controller for a variable geometry type turbocharger in which damage of an engine due to excessively supercharged air is prevented.

According to the present invention, there is provided a controller for a variable geometry type turbocharger comprising variable geometry means for varying a sectional area of throttle throat of a turbine through which exhaust gases from an engine is supplied to the turbine to change flow velocity of exhaust gases introduced into the turbine, bypass means including a bypass path which bypasses the turbine to reduce the amount of exhaust gases introduced into the turbine, first drive means for driving said variable geometry means, second drive means for driving said bypass means and control means for controlling said first and second drive means on the basis of engine speed and amount of air introduced into the engine.

Further, according to the present invention, since the variable geometry means for varying the amount of exhaust gas introduced into the turbine and the bypass means for bypassing the turbine to reduce the amount of exhaust gas introduced into the turbine are controlled by the control means on the basis of the engine speed and the amount of air introduced into the engine so that a predetermined supercharged air is obtained in a range from a low speed area to a high speed area of the engine, torque of the engine in the overall operating area can be improved by the variable geometry means at the low and middle speed area and by the bypass means at the high speed area.

According to an aspect of the present invention, the supercharged air at an outlet of a compressor is used as a driving source of the drive means, and hence a feedback force is effected between the variable geometry means and the bypass means to prevent damage of the engine.

BRIEF DESCRIPTION OF DRAWINGS

The above and other objects and features of the present invention will be apparent from the following description taken in connection with the accompanying drawings, in which.

DESCRIPTION OF THE PREFERRED EMBODIMENTS

Figure 1:
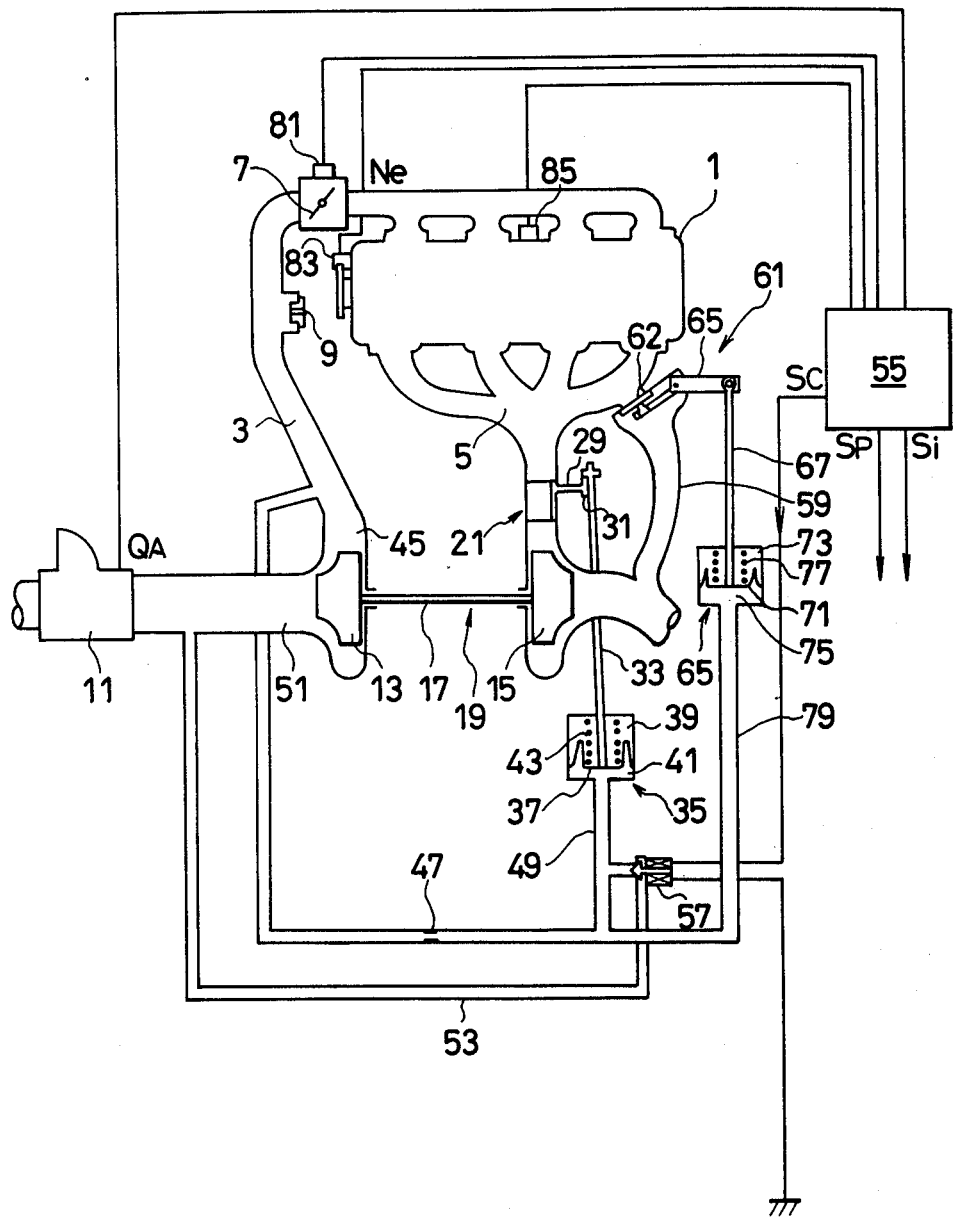
FIG. 1 illustrates the overall configuration of a controller for a variable geometry type turbocharger according to a first embodiment of the present invention.

Referring to FIG. 1, an intake pipe 3 and an exhaust pipe 5 are coupled to an engine body 1. A throttle valve 7 is disposed in the intake pipe 3 near the engine body 1, and a safety valve 9 and an airflow meter 11 are provided upstream of the throttle valve 7, that is, on the opposite side to the engine body 1. A compressor 13 is disposed on the way of the intake pipe 3 between the airflow meter 11 and the safety valve 9 while a turbine 15 is disposed on the way of the exhaust pipe 5. The compressor 13 and the turbine 15 are coupled to each other through a coupling shaft 17 in interlocked relationship to form a turbocharger 19.

Figure 2:
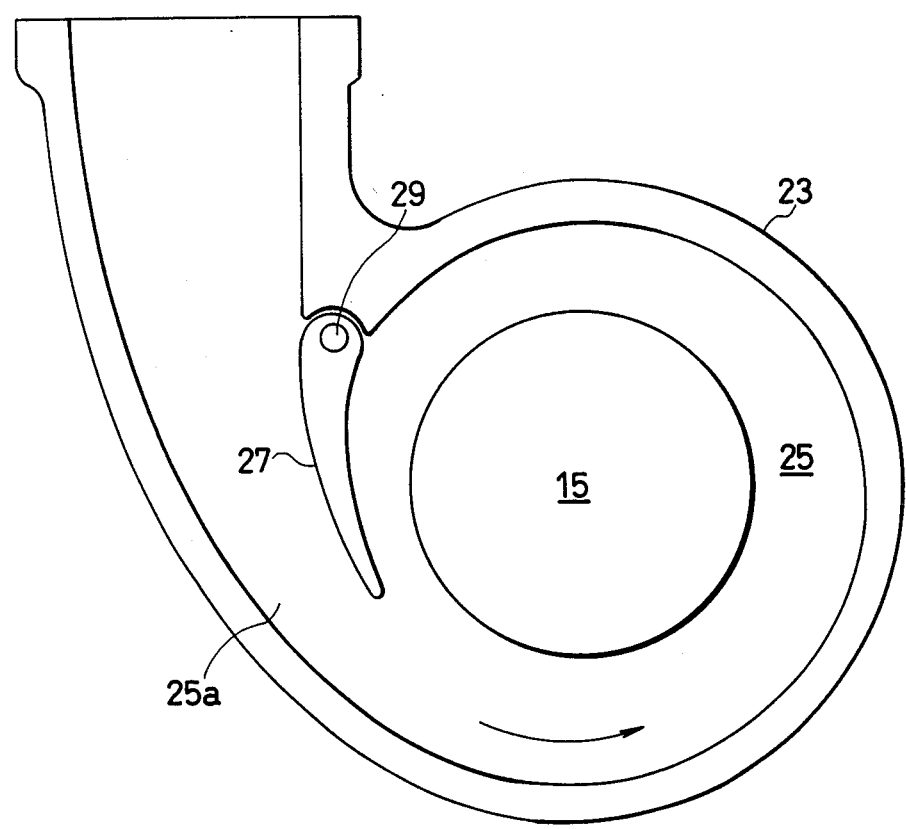
FIG. 2 is an enlarged sectional view of a part of a variable geometry means.

A variable geometry mechanism 21 which changes flow velocity of exhaust gases introduced into the turbine 15 is disposed in the exhaust pipe 5 near the turbine 15 and between the turbine 15 and the engine body 1. The variable geometry mechanism 21 includes a flap valve 27, as shown in FIG. 2, which is swingably attached through a shaft 29 to an throttle throat 25a of a scroll 25 formed in a turbine housing 23 to change a sectional area of the throttle throat 25a through which exhaust gases are introduced into the turbine. The shaft 29 is coupled through an arm 31 with a rod 33 which can move upward and downward as shown in FIG. 1. The variable geometry mechanism is so constructed that the flap valve 27 is swung counterclockwise in FIG. 2 through the arm 31 and the shaft 29 to increase the sectional area of the throttle throat 25a when the rod 33 is moved upward.

A lower end of the rod 33 is coupled to a diaphragm 37 of a first actuator 35, which is a first drive means. The inside of the actuator 35 is divided to an upper atmospheric pressure chamber 39 and a lower positive pressure chamber 41 by the diaphragm 37.

The diaphragm 37 is pressed toward the chamber 41 by a spring 43 provided in the chamber 39. The chamber 41 of the actuator 35 communicates through a pipe 49 having an orifice 47 therein with the intake pipe 3 near the compressor 13, that is, an outlet 45 of the compressor 13. An inlet 51 of the compressor 13 near the airflow meter 11 communicates through a pipe 53 with the pipe 49 between the orifice 47 and the chamber 41. The pipe 53 is provided with a solenoid operated valve 57 forming a control valve which opens and closes the pipe 53 in response to an on-and-off ratio control signal, that is, a duty ratio control signal generated from a control unit 55. When the solenoid operated valve 57 is on, the pipe 53 is opened, and when the valve 57 is off, the pipe 53 is closed.

A bypass mechanism 61 provided with a bypass path 59 for bypassing the turbine 15 is disposed in the exhaust pipe 5 between the engine body 1 and the variable geometry mechanism 21. The bypass mechanism 61 includes a bypass valve or waste gate 63 which opens and closes to connect and disconnect the bypass path 59 with the exhaust pipe 5 and is coupled with a rod 67 through a link 65. When the rod 67 is moved upward in FIG. 1, the bypass valve 63 is opened to connect the bypass path 59 with the exhaust pipe 5. A lower end of the rod 67 is coupled with a diaphragm 71 of a second actuator 69 forming second drive means and the inside of the actuator 69 is divided into an upper atmospheric pressure chamber 73 and a lower positive pressure chamber 75. A spring 77 which urges the diaphragm 71 toward the positive pressure chamber 75 is disposed in the chamber 73. The positive pressure chamber 75 communicates through a pipe 79 with the pipe 49 between the first actuator 35 and the orifice 47. Accordingly, since the chamber 75 communicates with the outlet 45 of the compressor 13 in the same manner as in the chamber 41 of the first actuator 35 the chamber 75 is applied with a pressure at the outlet 45 of the compressor, that is, the supercharged air from the compressor through the solenoid operated valve 57.

The throttle valve 7 is provided with a throttle valve sensor 81 for sensing an opening of the valve 7, and the engine body 1 is provided with a rotational speed sensor 83 which detects the rotational speed Ne of the engine and a knocking sensor 85 which detects knocking generated in the engine. Signals detected by the sensors 81, 83 and 85 are applied to the control unit 55. The intake air quantity Qa measured by the airflow meter 11 is also applied to the control unit 55.

The control unit 55 includes a microcomputer which is mainly composed of a microprocessor, a memory and an interface through which the signals from the sensors 81, 83 and 85 and the airflow meter 11 are supplied to the microprocessor. Analog signals, if contained, are converted to digital signals by means of an analog-to-digital converter not shown and the digital signals are supplied to the microprocessor. A program for controlling the microprocessor and various data necessary for a calculation executed by the microprocessor are stored in the memory and other data taken in from the outside are also stored in the memory temporarily. The microprocessor calculates a fuel injection quantity, a fuel injection timing and an ignition timing in accordance with the program to produce an injection signal Si and an ignition signal Sp suitable for the operating condition of the engine, and also calculates a duty value for the solenoid operated valve 57 to apply a control signal Sc corresponding to the duty value to the valve 57 so as to control the variable geometry mechanism 21 and the bypass mechanism 61.

Operation of the apparatus of FIG. 1 will now be described.

When the internal combustion engine is operated, the exhaust gases produced from the engine body 1 is introduced into the turbine through the exhaust pipe 5 to operate the turbocharger 19. When the turbocharger 19 is operated, the pressure of the supercharged air at the outlet 45 of the compressor 13 is increased, so that the pressure in the chambers 41, 75 of the actuators 35, 69 communicating with the outlet of the compressor 13 is also increased. On the other hand, the control unit 55 is supplied with the signals of the airflow meter 11, the throttle valve sensor 81, the rotational speed sensor 83 and the knocking sensor 85 and calculates a duty ratio on the basis of the signal to supply a control signal Sc corresponding to the calculated duty ratio to the solenoid operated valve 57 so that the pressures in the chambers 41, 75 are adjusted to control the variable geometry mechanism 21 and the bypass mechanism 61 in an interrelated manner.

Thus, when the duty ratio is small, for example, that is, when the off state of the valve 57 is longer and the on state is shorter, the cut-off time of the pipe 53 becomes longer and the pressure in the chambers 41, 75 is increased. When the pressure in the chambers 41, 75 is increased, the diaphragms 37, 71 in the actuators 35, 69 are moved against the springs 43, 77. Then, the rod 33 is moved upward by the movement of the diaphragm 37, and the shaft 29 and the flap valve 27 are swung counterclockwise in FIG. 2 through the arm 31 to increase the sectional area of the throttle throat 25a of the scroll 25. On the other hand, the rod 67 is moved upward by the movement of the diaphragm 71, and the bypass valve 63 is opened by means of the link 65 to bypass the turbine 15 and reduce the exhaust gases introduced into the turbine. The valve opening timing and the valve opening quantity of the flap valve 27 of the variable geometry mechanism 21 and the bypass valve 63 of the bypass mechanism 61 are determined on the basis of the pressure of the supercharged air at the outlet 45 of the compressor 13 and the duty ratio for the solenoid operated valve 57 calculated by the control unit 55 in accordance with the signals of the airflow meter 11, and the engine speed sensor 83. As a result, since the pressure of the supercharged air introduced into the engine is always maintained to an optimum value, torque of the engine is improved in all the operating area.

Control operation of the control unit 55 will now be described with reference to the flowchart shown in FIG. 3.

Figure 3:
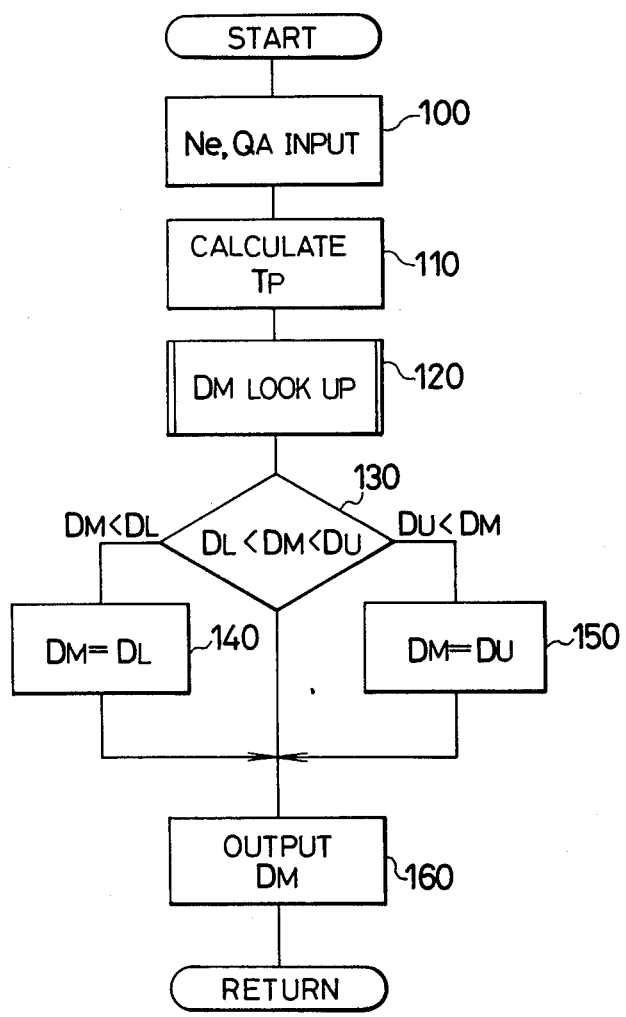
FIG. 3 is a flowchart showing the operation of a control unit used in the controller of FIG. 1.
Figure 4:
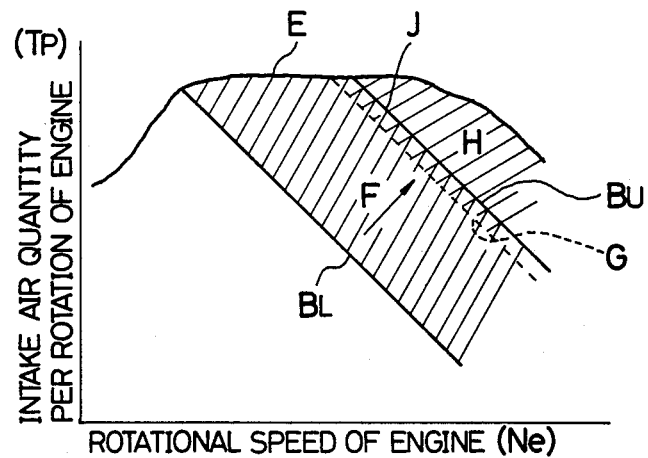
FIG. 4 is a graph showing the relation between the rotational speed Ne of the engine and the amount Tp of air supplied to the engine per rotation of the engine.

The operation shown by the flowchart of FIG. 3 is executed for example, once per rotation of the engine or at regular intervals on the basis of the program of the control unit 55. When the program operates, a calculation routine of the duty ratio for the solenoid operated valve 57 is executed after a JOB execution procedure in a JOB control portion is determined. In the calculation routine, digital signals of the rotational speed Ne of the engine and the intake air quantity Qa converted by an analog-to-digital converter not shown are supplied to the microprocessor in a step 100. Then, the intake air quantity Tp per rotation of the engine is calculated in a step 110. In a next step 120, a basic duty value Dm on the basis of the rotational speed Ne of the engine and the intake air quantity Tp per rotaton is looked up in a control table in which the duty values are tabulated for the rotational speeds Ne and the intake air quantity Tp as shown in FIG. 4.

In the table, since data for the rotational speed Ne and the intake air quantity Tp are definite, a duty value for the rotational speed Ne and the intake air quantity Tp which are not shown in the table is determined by a proportional interpolation calculation.

Figure 5:
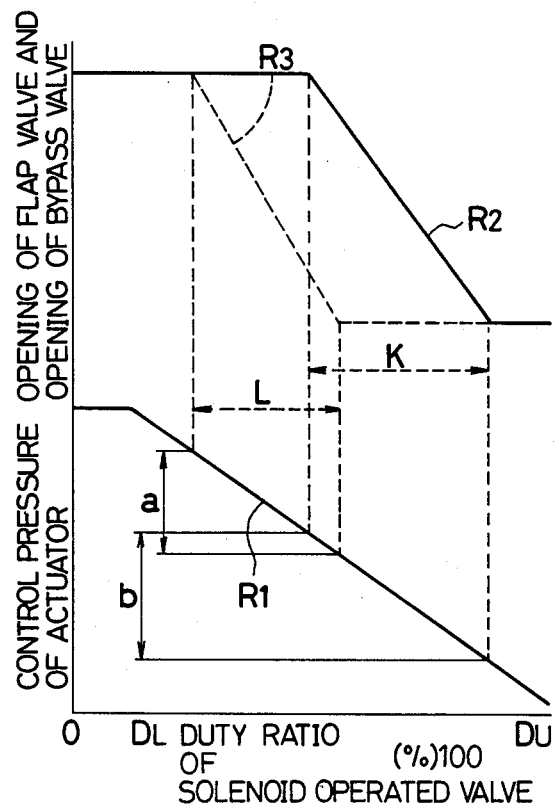
FIG. 5 is a graph showing the relation between a duty ratio for controlling a solenoid operated valve and a control pressure of an actuator, an opening of a flap valve and an opening of a bypass valve.

The duty value for the valve 57 has the upper limit Du and the lower limit Dl as shown in FIG. 5. This is because both utmost limits of 0 and 100% for the duty ratio in view of an operation delay time of the solenoid operated valve and an error of the calculation. Accordingly, in step 130, judgment is made as to whether the duty value Dm detected from the table is between the upper limit Du and the lower limit Dl or not. If the duty value Dm is larger than the upper limit Du, the duty value Dm is set to the upper limit Du in step 150. If the duty value Dm is smaller than the lower limit Dl, the duty value Dm is set to the lower limit Dl in step 140.

The duty value Dm thus obtained is stored in the memory of the control unit 55 and is supplied from the control unit 55 through the interface to the solenoid operated valve 57 as the signal Sc in step 160.

The control table is now described with reference to FIG. 4. In FIG. 4, the ordinate axis represents the rotational speed Ne of the engine and the abscissa axis represents the intake air quantity Tp per rotation of the engine. A torque curve E represents an operation line that when the throttle valve 7 is opened to its full extent. A line Bl represents an operation line when the flap valve 27 is closed to its full extent (to a minimum sectional area), the pressure of the supercharged air at the outlet 45 of the compressor reaches a predetermined value, for example, a mercurial column of 375 mm. A line Bu represents an operation line that when the flap valve 27 is opened to its full extent (to a prescribed sectional area), the pressure of the supercharged air reaches a predetermined value, for example, a mercurial column of 375 mm. In an area F between the lines Bl and Bu, the flap valve 27 can open to change the opening of the throttle throat 25a for the turbine 15 through which the exhaust gases are supplied to the turbine. The flap valve 27 opens to increase the sectional area of the throttle throat 25a of the scroll 25 along an arrow shown in FIG. 4.

The bypass valve 63 operates in an area H between a dashed line G which is set before the line Bu (in the area F in the case of FIG. 4) and the line E. In the present embodiment, the duty values in the area F and the duty values in the area H with regard to the rotational speed Ne of the engine and the intake air quantity Tp per rotation of the engine are given in a single control table. The duty values in the table are determined on the basis of the rotational speed Ne and the intake air quantity Tp so that the prescribed pressure of the supercharged air is obtained in consideration of the characteristics, the durability and the reliability of the engine.

FIG. 5 shows the relation of the duty value for the valve 57, the control pressure for the first and second actuators 35, 69, that is, the internal pressure of the chamber 41, 75, the opening of the flap valve 27 and the opening of the bypass valve 63. A solid line R1 represents a relation between the duty value and the control pressure for the actuators, another solid line R2 represents a relation of the duty value and the opening of the flap valve, and a dashed line R3, represents a relation of the duty value and the opening of the bypass valve. The duty values in the range shown by K correspond to the duty values used in the portion F of FIG. 4 and the duty values in the range shown by L correspond to the duty values used in the portion H of FIG. 4. Letters a and b in FIG. 5 represent control pressures for the first and second actuators, respectively.

As apparent from FIG. 5, the spring constants for the first and second actuators are selected depending on the respective control pressures to operate the flap valve 27 and the bypass valve 63 smoothly in the interrelated manner, so that the opening operation of the bypass mechanism is surely limited or inhibited in the operating area of the variable geometry mechanism 21. Thus, the degradation of the pressure of the supercharged air can be prevented.

Further, the overlap area J of the areas F and H of FIG. 4 can be adjusted by changing the elastic force of the springs 43, 77 of the first and second actuators 35, 69 so that the change from the operating area of the variable geometry mechanism to the operating area of the bypass mechanism can be made smoothly.

Figure 6:
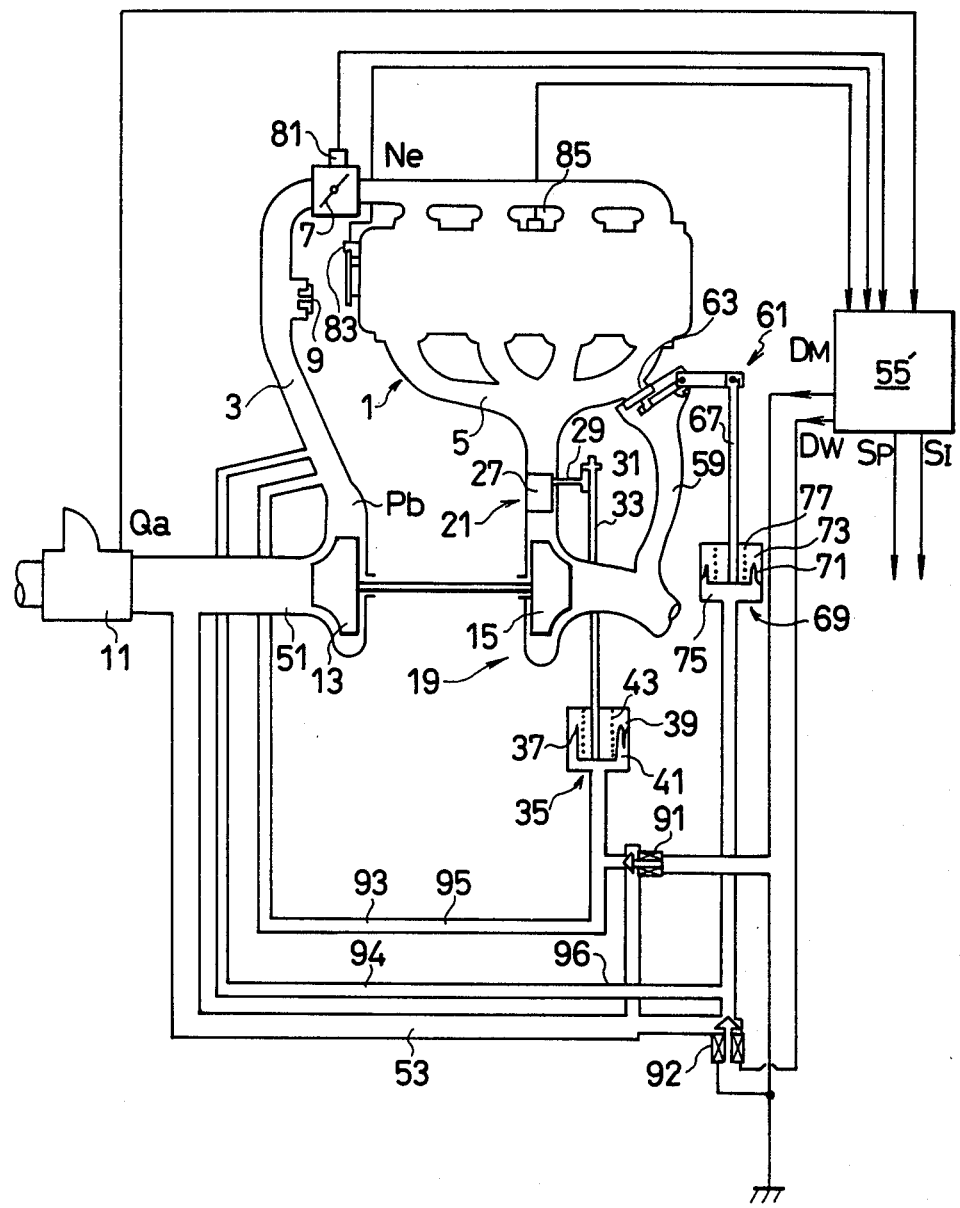
FIG. 6 illustrates the overall configuration of a controller for a variable geometry type turbocharger according to a second embodiment of the present invention.

FIG. 6 shows a second embodiment of the present invention. The second embodiment of FIG. 6 is identical with the first embodiment of FIG. 1 except that the first and second actuators 35 and 69 are independently controlled by first and second solenoid operated valves 91 and 92 which are disposed on the way of first and second pipes 93 and 94 which include orifices 95, 96 therein and coupled the chambers 41 and 75 of the first and second actuators 35 and 69 with the outlet 45 of the compressor 13. The valves 91 and 92 are controlled by duty signals Sm and Sw supplied from the control unit 55', respectively.

Operation of the control unit 55' will now be described with reference to the flowcharts of FIGS. 7(A) and 7(B).

Figure 7A:
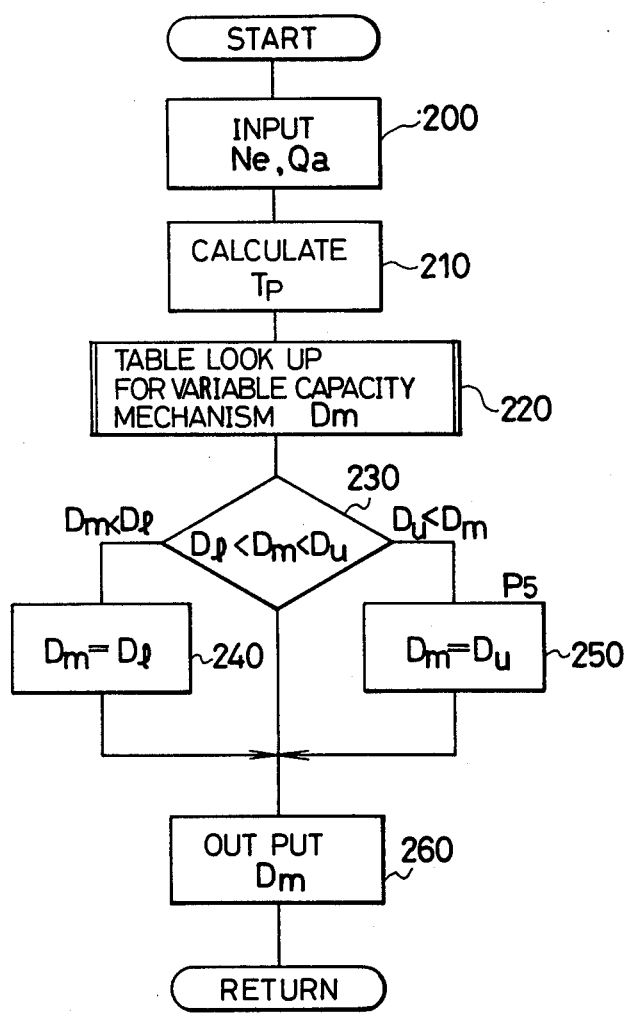
FIGS. 7(A) and 7(B) are flowcharts showing the operation of a control unit used in the controller of FIG. 6.
Figure 7B:
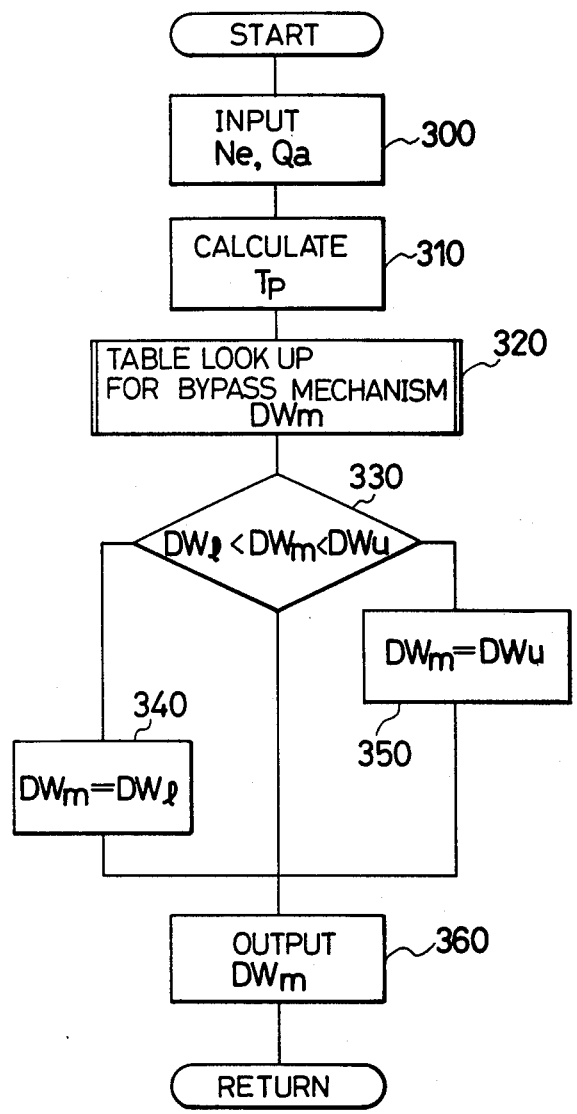

The control operations shown by the flowcharts of FIGS. 7(A) and 7(B) are executed, for example, once per rotation of the engine or at regular intervals, respectively. When the program operates, calculation routines of the duty ratio for the solenoid operated valves 91 and 92 of the variable geometry mechanism and the bypass mechanism shown in FIGS. 7(A) and 7(B), respectively, are executed after a JOB execution procedure in a JOB control portion is determined.

Figure 8:
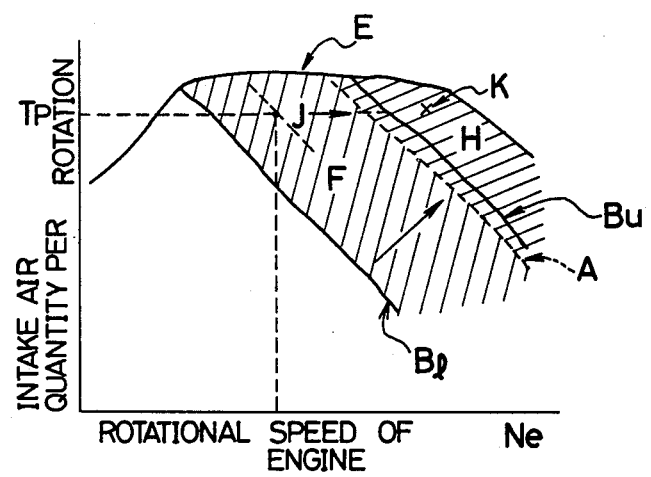
FIG. 8 is a graph showing the relation between the rotational speed Ne of the engine and the amount Tp of air supplied to the engine per rotation of the engine.

Referring to FIG. 7(A), the execution of the calculation routine of the duty ratio for the valve 91 of the variable geometry mechanism is described. Analog-to-digital converted values of the rotational speed Ne of the engine and the intake air quantity Qa are inputted to the control unit 55' in a step 200 and an intake air quantity Tp per rotation of the engine is calculated in a step 210. Then, in a step 220, a basic duty value Dm on the basis of the rotational speed Ne of the engine and the intake air quantity Tp per rotation of the engine is looked up in a table in which the duty values are tabulated for the rotational speeds Ne and the intake air quantity Tp as shown in FIG. 8.

In the table, since data for the rotational speed Ne and the intake air quantity Tp are definite, a duty value for the rotational speed Ne and the intake air quantity Tp which are not shown in the table is determined by the proportional interpolation calculation in the same manner as in the first embodiment.

In a step 230, judgment is made as to whether the basic duty value Dm is between the upper limit Du and the lower limit Dl. This is because both utmost limits of 0 and 100% for the duty ratio are removed in view of an operation delay time of the solenoid operated valve and an error of the calculation. If the basic duty value Dm is larger than the upper limit Du, the duty value Dm is set to the upper limit Du in step 250. If the duty value Dm is smaller than the lower limit Dl, the duty value Dm is set to the lower limit Dl in step 240.

The duty value Dm thus obtained is stored in the memory of the control unit 55' and is supplied from the control unit 55' through the interface to the solenoid operated valve 91 as the signal Sm in step 260.

Referring to FIG. 7(B), the execution of the calculation routine of the duty ratio for the valve 92 of the bypass mechanism is described. Analog-to-digital converted values of the rotational speed Ne of the engine and the intake air quantity Qa are supplied to control unit 55' in a step 300 and an intake air quantity Tp per rotation of the engine is calculated in a step 310. Then, in a step 310, a basic duty value DWm on the basis of the rotational speed Ne of the engine and the intake air quantity Tp per rotation of the engine is looked up in a table in which the duty values are tabulated for the rotational speeds Ne and the intake air quantity Tp as shown in FIG. 8.

In the table, since data for the rotational speed Ne and the intake air quantity Tp are definite, a duty value for the rotational speed Ne and the intake air quantity tp which are not shown in the table is determined by the proportional interpolation calculation.

In a step 330, judgment is made as to whether the basic duty value DWm is between the upper limit DWu and the lower limit DWl. This is because both utmost limits for the duty ratio are removed in view of an operation delay time of the solenoid operated valve and an error of a soft portion. If the basic duty value DWm is larger than the upper limit DWu, the duty value DWm is set to the upper limit DWu in step 350. If the duty value DWm is smaller than the lower limit DWl, the duty value DWms set to the lower limit DWl in step 340.

The duty value DWm thus obtained is stored in the memory of the control unit 55' and is supplied from the control unit 55' through the interface to the solenoid operated valve 92 as the signal Sw in step 360. In this embodiment, the duty value DWm has been described in such a manner that it is given in accordance with Ne and Tp in the table. However, the table may be determined only by intake air quantity Qa. Namely, when a required duty value for holding the supercharged pressure at a predetermined value is the same duty as that on the characteristc line of Ne×Tp=constant the duty may be determined by the Qa mentioned above, since the relationship Tp=(Qs/Ne) x k is still maintained. Accordingly, in the case where the table is given by Qa, the flow rate may be determined by the parameters of Ne' and Tp. This indicates one example of a simplified method when the require value of Ne×Tp=constant is the same value.

Next, control operation of the second embodiment shown in FIG. 6 is described with reference to FIG. 8.

FIG. 8 is substantially identical with FIG. 4. However, in the second embodiment, there are provided with two tables corresponding to the areas F and H of FIG. 8 and which are used to determine the basic duty values Dm and DWm for the valves 91 and 92 for the variable geometry mechanism and the bypass mechanism as shown in FIGS. 7(A) and 7(B).

Assuming that the engine is in an operating condition shown by J of FIG. 8, the opening of the flap valve 27 is determined on the basis of the table corresponding to the area F of FIG. 8 and the variable geometry mechanism is operated.

In other words, the basic duty value Dm is determined as shown in FIG. 7(A) and the valve 91 of FIG. 6 is driven by the duty value Dm. The supercharged air applied to the first actuator 35 is released to the pipe 53 to reduce the pressure applied to the actuator 35 depending on the duty ratio. As the duty value is small, the off-time of the valve 91 is increased and the amount of supercharged air released to the pipe 53 is reduced.

Accordingly, the flap valve 27 is opened through the link 31 to increase the opening of the flap valve 27.

Thus, when the operation point of the engine moves from the point J in the direction shown by an arrow, the opening of the flap valve increases and the capacity of the turbocharger increases. In the area F of FIG. 8, the duty value obtained from the table for the bypass mechanism 61 is set to a predetermined value so that the valve 92 is substantially opened, and the bypass valve 63 is maintained closed by means of the spring 77. Accordingly, the exhaust gases from the engine are supplied to the turbine 15 without bypassing the turbine and the turbocharger can produce the prescribed supercharged air, so that the engine can output the prescribed torque.

Thus, when the operating point of the engine enters into the area H and reaches a point K, the duty value DWm is determined as shown by the flowchart of FIG. 7(B) to supply it to the valve 92 as the signal Sw. At the same time, the valve 91 is controlled by a duty value so that the flap valve 27 is opened to its full extent. As the duty value for the valve 92 is small, the bypass valve 63 is opened to bypass the turbine and reduce the exhaust gases supplied to the turbine 15. Accordingly, the prescribed supercharged air can be introduced into the engine 1 in the operating point K and the prescribed torque can be obtained. Furthermore, the pressure of the supercharged air is not increased to excess to prevent damage of the engine.

In other words, the duty values for both the tables, the spring constants for both the springs and the orifices are determined so that the bypass valve is closed to its full extent in the overlap area of the areas F and H when the flap valve is opened to its full extent in the range where a predetermined pressure of the supercharged air can be obtained. Thus, when the engine is accelerated and the operating point of the engine moves from the area F to the area H, the step like generation of the pressure of the supercharged air due to variation or setting of parts of both the drive means can be prevent.

In the above embodiment, since the pressure of the supercharged air is used as a pressure source for the actuators, the pressure of the supercharged air is increased greater than a predetermined value. Then, the flap valve 27 or the bypass valve 61 opens through the actuator 35 or 69, therefore the pressure of the supercharged air is reduced while in the opposite condition the pressure of the supercharged air is increased.

Further, when the duty value for the valve 92 is a predetermined range without fully open and close condition and the spring constant of the spring 77 is properly selected, the pressure of the supercharged air is not increased to excess since the bypass valve 63 is opened by the increase of the pressure of the supercharged air even if the flap valve is operated in error in the operating area of the variable geometry mechanism.

Figure 9A:
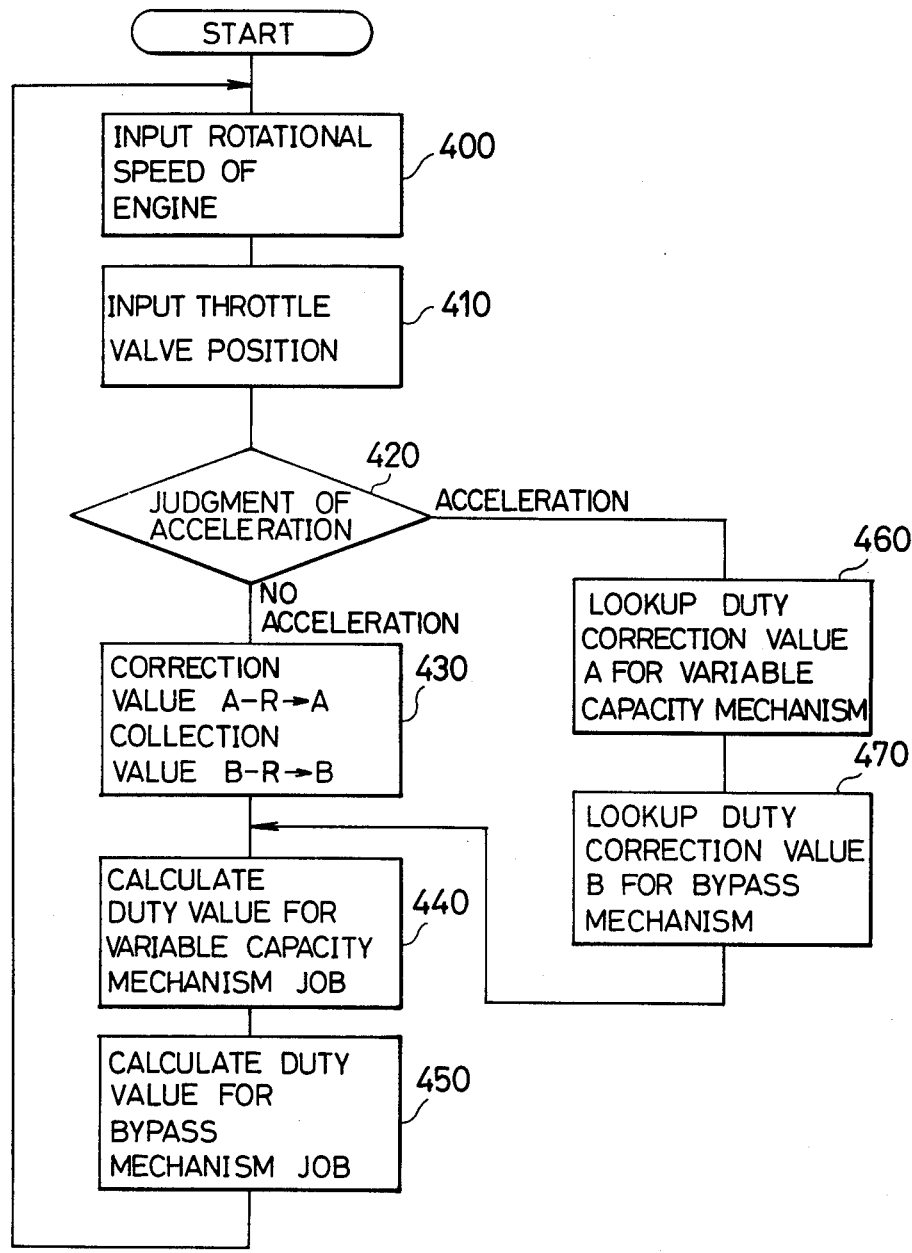
FIGS. 9(A) and 9(B) are flowcharts showing the operation of a control unit used in the controller of FIG. 6 according to another embodiment of the present invention.
Figure 9B:
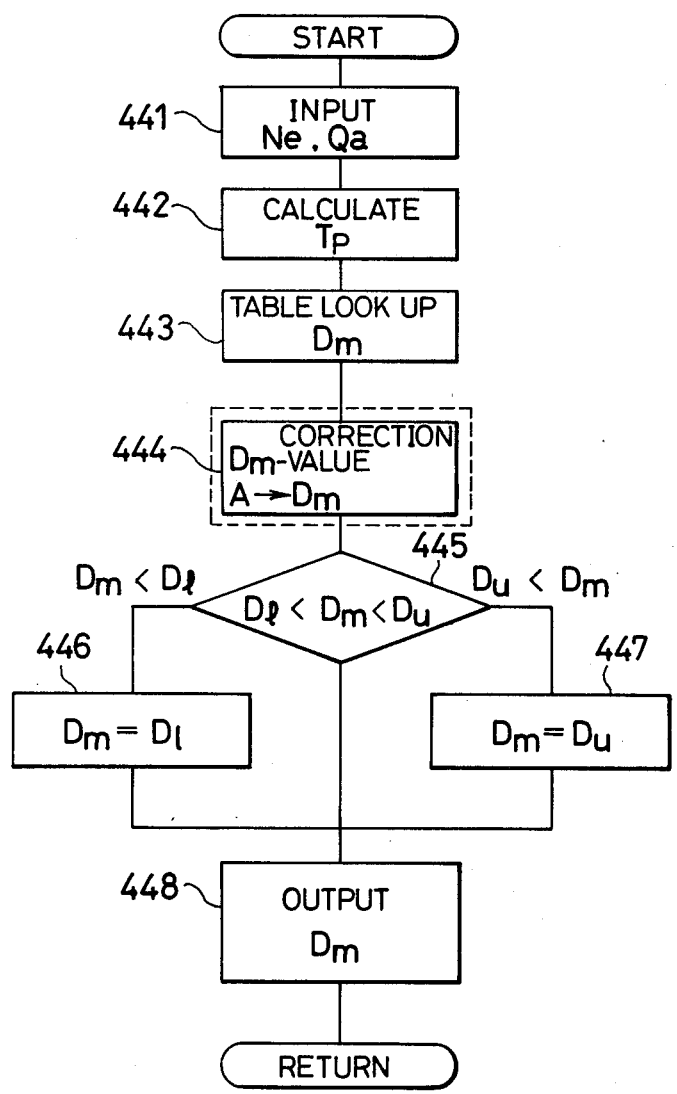

FIGS. 9(A) and 9(B) are flowcharts showing operation of another embodiment of the present invention.

In this embodiment, when the engine is accelerated, the pressure of the supercharged air is increased greater than an ordinary value in the operating area of the variable geometry mechanism or the bypass mechanism so that the acceleration operation is improved.

Referring to FIG. 9(A), the engine speed is inputted in step 400 and a position of the throttle valve is also inputted from the throttle valve sensor 81 in step 410. In step 420, judgment is made as to whether the engine is in an accelerated condition or not. If accelerated, a correction value A for the duty value of the variable geometry mechanism and for increasing the pressure of the supercharged air by a predeterminmed value is read out from a one-dimensional table based on the rotational speed Ne in step 460, and a corrective value B for the duty value of the bypass mechanism and for increasing the pressure of the supercharged air by a predetermined value is read out from a one-dimensional table based on the rotational speed Ne in step 470. If not accelerated, the correction values A and B are reduced by k for each unit time to be zero finally in step 430. This step is to prevent a sudden variation of torque from being produced when the engine is changed from the acceleration operation to the ordinary operation.

In steps 440 and 450, the duty values for the variable capacity mechanism and the bypass mechanism are looked up in the tables, respectively, and the obtained duty values are corrected. Then, the process is returned to the step 400 and the same operation is repeated.

FIG. 9(B) shows detail of the operation in the step 440 of FIG. 9(A). The detailed operation is the same as the operation shown in FIG. 7(A) or 7(B) except that a new step 444 is added in which the duty value Dm obtained in step 443 is corrected by subtracting the correction value A.

Figure 10:
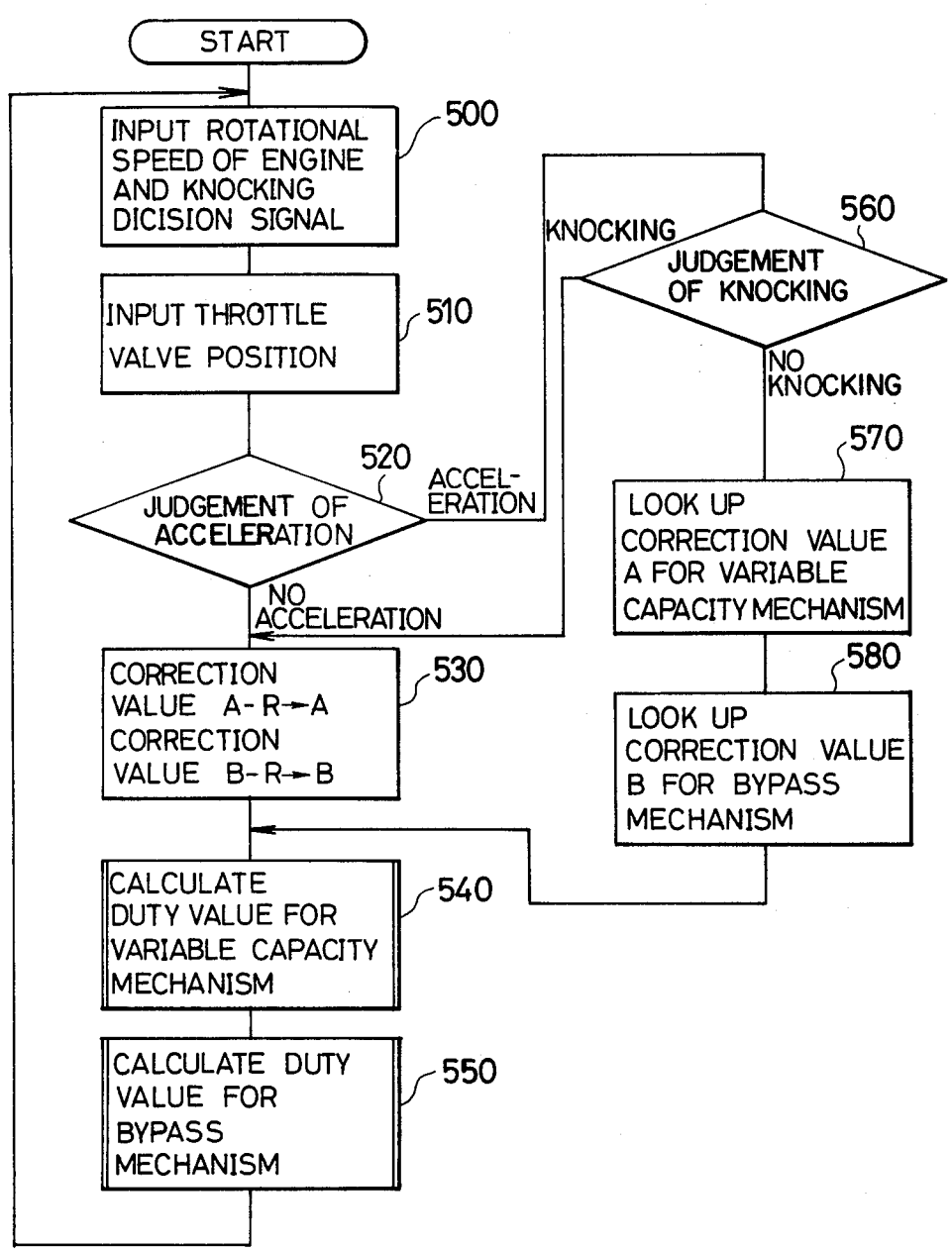
FIG. 10 is a flowchart showing the operation of a control unit used in the controller of FIG. 6 according to a still another embodiment of the present invention.

FIG. 10 is a flowchart showing operation of still another embodiment of the present invention.

In this embodiment, when the engine is accelerated and the pressure of the supercharged air is increased greater than an ordinary value, if the knocking is generated in the engine, the correction value A or B is reduced by a constant value k for each unit time in the same manner as in the ordinary operation of FIG. 9 to be the original table value smoothly.

In other words, a signal for determining whether the knocking is generated in the engine is inputted from the knocking sensor 85 (FIG. 6) in step 500. The knocking signal is produced from a known knocking decision circuit used in a conventional engine with a turbocharger. If it is judged that there is knocking in step 560 after acceleration, the correction value A or B is reduced in step 530 in the same manner as in the ordinary operation and the process goes to steps 540 and 550. If it is judged that there is no knocking, the correction value A or B for increasing the pressure of the supercharged air by a predetermined value is looked up in steps 570 and 580.

What is claimed is:

1. A method of controlling the supercharging pressure of a variable geometry type turbocharger having a bypass, comprising the following steps which are carried out successively:

(a) receiving signals from an engine speed sensor and from an engine knocking sensor;

(b) receiving a signal from a throttle valve sensor;

(c) judging whether or not an engine is being accelerated, and proceeding to step (e) below if the engine is being accelerated and to step (d) below if the engine is not being accelerated, i.e., if the engine is in a constant speed operation;

(d) determining a first correction value and proceeding to step (g) below;

(e) judging whether or not the engine is knocking, and proceeding to step (d) if knocking is occurring and to step (f) below if no knocking is occurring;

(f) determining a second correction value and proceeding to step (g);

(g) receiving signals from said engine speed sensor and from an airflow meter which measures the quantity of airflow to be supplied to the engine;

(h) calculating an airflow rate per engine revolution;

(i) determining a duty valve according to said calculated airflow rate;

(j) determining a corrected duty value by subtracting one of said first and second correction values which has been determined in previous steps from said duty value;

(k) comparing said corrected duty value with an upper limit value and a lower limit value;

(l) changing said corrected duty value to be equal to said upper limit value if said corrected duty value exceeds said upper limit value, and to said lower limit value if said corrected duty value is less than said lower limit value, and leaving as it is if said corrected duty value is between said upper and lower limit values; and (m) transmitting said corrected duty value to control means for controlling the geometry of said variable geometry type turbocharger and the opening said of bypass of said turbocharger, thereby controlling the supercharging pressure of said turbocharger.

2. A method according to claim 1, wherein said first correction value of step (d), second correction value of step (f), and duty value of step (i) are determined according to respective received signals by referring to lookup table resepctively.

3. A method according to claim 2, further comprising a step for calculating and signaling a fuel injection amount, and a fuel ignition timing.

4. A method according to claim 3, wherein said first correction value is reduced by a predetermined rate whenever said step (d) is carried out.

5. A method according to claim 4, wherein said first correction value is not reduced less than zero.

6. A method according to claim 5, wherein said steps are carried out for every revolution of the engine.

7. A method according to claim 5, wherein said steps are carried out cyclically with predetermined time intervals.

* * * * *